US009064069B1

(12) United States Patent
Lind et al.

(10) Patent No.: US 9,064,069 B1
(45) Date of Patent: Jun. 23, 2015

(54) CREATING AN END POINT REPORT BASED ON A COMPREHENSIVE TIMING REPORT

(71) Applicant: International Business Machines Corporation, Armonk, NY (US)

(72) Inventors: Kurt Lind, Tuebingen (DE); Peter G. Loeffler, Dettenhausen (DE); Siegmund Schlechter, Lorch (DE); Friedrich Schroeder, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/132,068

(22) Filed: Dec. 18, 2013

(51) Int. Cl.
*G06F 17/50* (2006.01)

(52) U.S. Cl.
CPC .................................. *G06F 17/5031* (2013.01)

(58) Field of Classification Search
CPC .................................. G06F 17/30; G06F 17/50

USPC ......................................................... 716/113
See application file for complete search history.

(56) References Cited

U.S. PATENT DOCUMENTS

| 8,245,167 | B1 | 8/2012 | e Silva et al. | |
| 8,522,182 | B2 | 8/2013 | Krauch et al. | |
| 2006/0190884 | A1* | 8/2006 | Nishida | 716/6 |
| 2008/0034338 | A1* | 2/2008 | Hosono | 716/6 |
| 2009/0007040 | A1* | 1/2009 | Nishida | 716/6 |
| 2009/0249270 | A1* | 10/2009 | Buck et al. | 716/6 |

\* cited by examiner

*Primary Examiner* — Vuthe Siek
*Assistant Examiner* — Mohammed Alam
(74) *Attorney, Agent, or Firm* — Stephen R. Yoder

(57) ABSTRACT

An end point report is created from a comprehensive timing report following steps that include: receiving a comprehensive timing report for an electronic circuit, determining a timing data set for a start pin, determining a worst timing path that includes the start pin based, at least in part, upon the comprehensive timing report, and generating an end point report for the worst timing path.

20 Claims, 6 Drawing Sheets

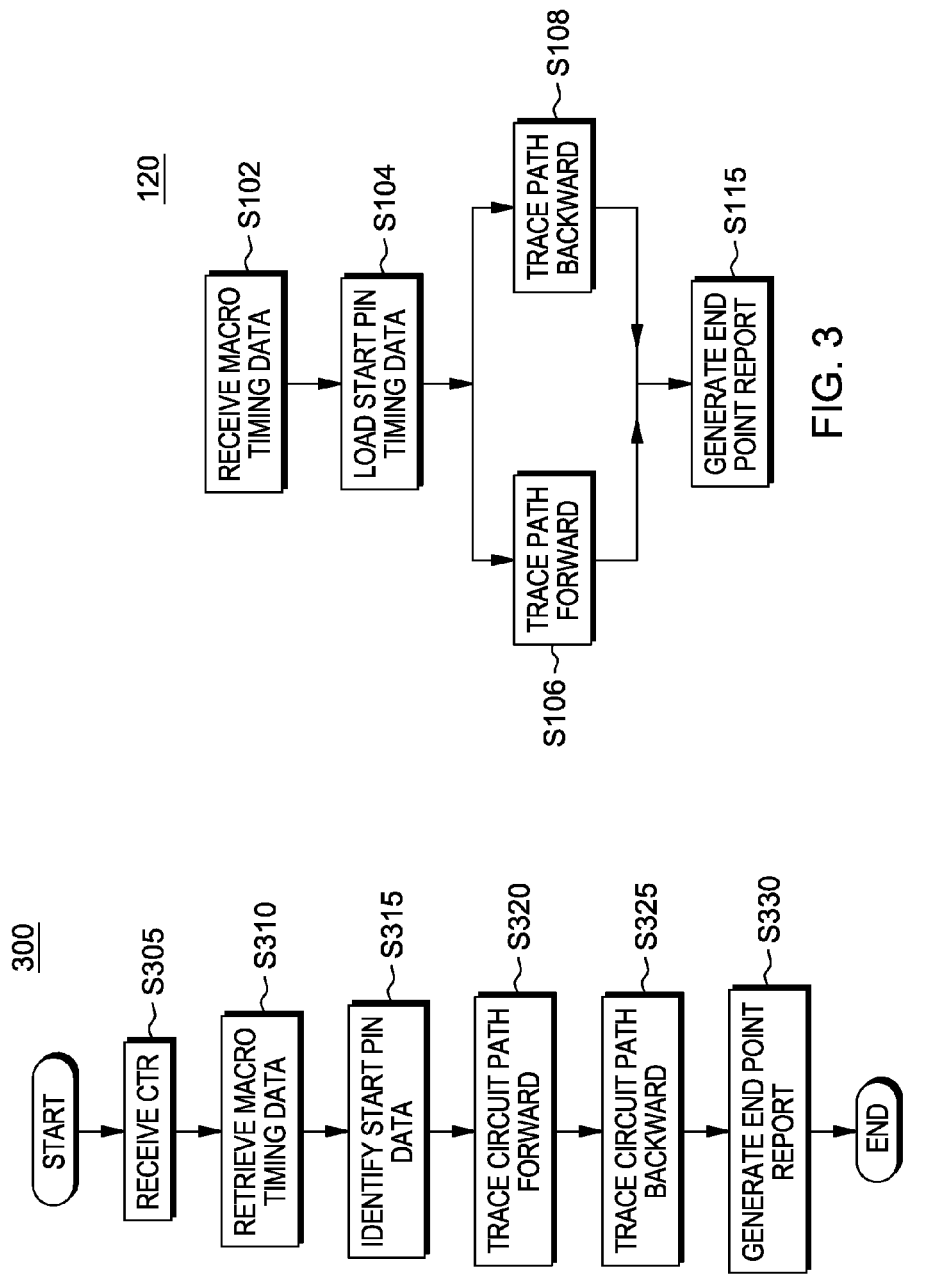

CREATING AN END POINT REPORT BASED ON A COMPREHENSIVE TIMING REPORT

FIELD OF THE INVENTION

The present invention relates generally to the field of integrated circuit (IC) design processing, and more particularly to timing analysis.

BACKGROUND OF THE INVENTION

High-performance integrated circuits have traditionally been characterized by the clock frequency at which they operate. Gauging the ability of a circuit to operate at the specified speed requires an ability to measure, during the design process, its delay at numerous steps.

The best source to analyze timing problems on a digital IC is the end point report (EPR), which shows the critical timing path through the circuit from a source pin (launching latch, or, in some cases, the chip input pin) to a target pin (receiving latch, or, in some cases, the chip output pin), including all involved devices and wires. The critical timing path is the path having the maximum delay between a given source pin and a corresponding target pin.

The end point report and the comprehensive timing report (CTR) are the output of a static timing analysis that computes timing data for a circuit. This timing data may be manually analyzed and investigated to find and/or eliminate the reasons for bad timing results. To clearly distinguish static timing analysis that computes timing data and the manual timing analysis that investigates the timing data for the reasons behind timing results, in this document, the term "simulation" is used in reference to static timing analysis and the term "timing analysis" is used in reference to manual timing investigation of the simulation results.

While EPRs are useful for timing analysis, typical EPRs are based on a timing simulation of an IC, which does not add all timing paths through the simulated circuit to the EPR. Conventional EPRs only contain the most critical paths and only contain the path for the most critical bit within a bus. Especially in a hierarchical design, for a subset of the circuit known as the lower hierarchy (also called a "macro"), a timing simulation abstract is created and used for the simulation of the whole circuit.

SUMMARY

According to one aspect of the present disclosure, there is a computer program product, system, and/or method which performs the following actions (not necessarily in the following order and not necessarily in serial sequence): receiving a comprehensive timing report for an electronic circuit, determining a timing data set for a start pin, determining a worst timing path that includes the start pin based, at least in part, upon the comprehensive timing report, and generating an end point report for the worst timing path.

BRIEF DESCRIPTION OF THE SEVERAL VIEWS OF THE DRAWINGS

FIG. 2 is a flowchart depicting operational steps of a first embodiment process of an end point report generator program, on the computing device of FIG. 1, for generating an end point report, in accordance with an embodiment of the present invention.

FIG. 3 is a flowchart depicting operational steps of a second embodiment process of an end point report generator program, on the computing device of FIG. 1, for generating an end point report, in accordance with an embodiment of the present invention.

DETAILED DESCRIPTION

Figure 1:
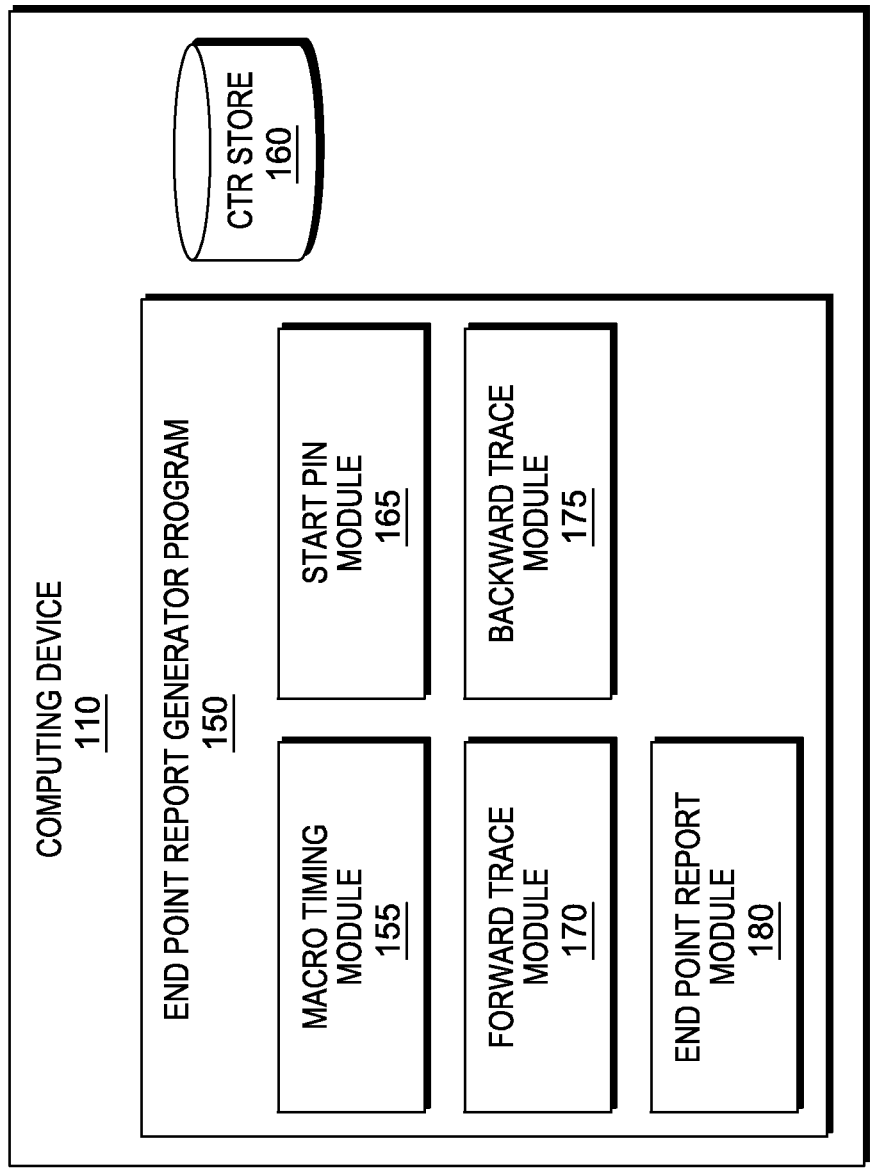
FIG. 1 is a functional block diagram illustrating a computing device in a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating end point report generator system 100 in accordance with an embodiment of the present invention. End point report generator system 100 includes computing device 110, which further includes end point report generator program 150.

In preferred embodiments of the invention, computing device 110 can be, for example, a mainframe or mini computer, a laptop, a netbook personal computer (PC), or a desktop computer. End point report generator system 100 is shown as being wholly implemented on computing device 110. However, end point report generator system 100 may operate in a distributed environment in which one or more of its components are implemented across a plurality of computing devices that communicate over a network, such as a local area network (LAN) or a wide area network (WAN), such as the Internet. For example, end point report generator program 150 may operate on a separate computing device having sufficient capabilities to support only the operation of the transaction analysis system. In general, end point report generator system 100 can execute on any computing device, or combination of computing devices, satisfying desired implementation requirements, and as described in relation to FIG. 7. Computing device 110 may include internal and external hardware components, as depicted and described in further detail with respect to FIG. 7.

End point report (EPR) generator program 150 processes a comprehensive timing report (CTR) typically produced by integrated circuit (IC) timing simulation. The EPR program uses the CTR to generate an EPR for the critical timing path with respect to a specified "start pin." In this embodiment, the EPR is generated for the worst case timing path. That is, the path having the worst case timing results of all the possible paths between the source pin and the target pin. Alternatively, the EPR generator program generates an EPR for the best case timing path. The EPR program includes: macro timing module 155; comprehensive timing report store 160; start pin module 165; forward trace module 170; backward trace module 175; and end point report module 180.

When IC timing simulation is performed, the resulting macro timing abstract only contains the most critical set of timing paths in the end point report (EPR). Oftentimes, when simulating the whole circuit, other paths through the macro level turn out to be the more critical paths than those stored with the macro timing abstract.

When a critical path is not stored with the macro timing abstract, an arbitrary timing path in the EPR is needed, but not available. Oftentimes, a macro EPR is required: (i) when analyzing unit or core timing by traversing from the upper hierarchy down to the lower macro hierarchy to see details about macro internal devices and wires; and/or (ii) when analyzing timing for macro pins that have positive slack. The slack associated with each connection is the difference between the required time (the latest time at which a signal can arrive without making the clock cycle longer than desired) and the arrival time (the time elapsed for a signal to arrive at a certain point). A positive slack at a node implies that the arrival time at that node may be increased by the amount of slack, s, without affecting the overall delay of the circuit. Conversely, a negative slack at a node implies that a path is too slow, and the path must be sped up (or the reference signal delayed) if the whole circuit is to work at the desired speed.

When the macro EPR test points for a particular path are not available because those test points were not considered to be part of a critical path at the time the macro simulation was performed, or for any other reason, the present disclosure provides a method for generating a macro EPR for the macro input or output pins, or test points, even if there is no matching EPR in the timing abstract. The timing abstract contains the comprehensive timing report, which includes timing data for all macro pins. Based on that timing data available in the CTR, the EPR for the selected path can be generated and appended to a comprehensive EPR for a more considered, or deeper, path analysis.

Conventionally, when a macro designer analyzes timing fails, he analyzes the macro EPRs produced by the timing simulation. However, the macro timing abstract may not include all the EPRs of interest. For example, the abstract may not include EPRs for all the bits of a bus, but only the most critical bit, or bits. Also, paths having relatively good timing may not be included in the macro timing data. This may occur in the interest of reducing storage requirements. Further, only the more critical paths may be represented by the stored EPRs. Because the macro timing abstract from the timing simulation does not contain an EPR for all possible paths through the circuit, it is likely that the designer will require an EPR for additional paths.

Some embodiments of the present disclosure provide a method for creating an EPR for any circuit path whether or not the EPR is stored with the timing abstract during IC timing simulation. Some embodiments of the disclosed method create an EPR based on the CTR, where timing information is stored for each pin (also known as a node, a vertex, or a test point) of the circuit. The CTR is considered a part of the macro timing abstract in that it is stored as a "side file" together with the actual timing abstract in the "timing rule" (also known as the new delay rule, or NDR).

Macro timing module 155 operates generally to retrieve the desired macro timing data from a designated CTR. As discussed above, the CTR is typically produced during IC timing simulation tests. CTR store 160, which may reside, for example, on persistent storage 708 of computing device 110, or, alternatively, in memory 706, (see FIG. 7), stores the CTRs for use by the macro timing module.

Start pin module 165 operates generally to identify the start pin for the end point report generator program 150. In this embodiment, the start pin module receives input from the user as to the start pin. Alternatively, the start pin is identified by diagnostic software. The start pin is the pin of interest for which the worst timing path is determined.

Forward trace module 170 operates generally to determine the worst case timing path by traversing a reconstruction of the circuit. This reconstruction simulates the circuit based on the CTR data. The forward trace module traces the path forward from the start pin to the macro output pin or the receiving latch. While tracing a path, the forward trace module creates a forward-traversed pin list of each pin traversed in that path.

Backward trace module 175 operates generally to determine the worst case timing path by traversing a reconstruction of the circuit based on the CTR data. The backward trace module traces the path backward to the macro input pin or the launching latch. While tracing a path, the backward trace module creates a backward-traversed pin list of each pin traversed in that path.

End point report module 180 operates generally to produce an end point report based on the pin lists produced by the forward and backward trace modules. The end point report module combines these pin lists to create an aggregate pin list. The aggregate pin list contains a list of each pin in the worst timing path that includes the start pin.

A method according to the present disclosure traverses a circuit reconstruction based on the timing simulation results. The method(s) disclosed herein consume simulation results and compensate for simulation optimization deficiencies. For example, when simulation optimization fails to store the EPR for each path within the simulated circuit in the interest of reduced time and/or memory requirements, the method starts from an arbitrary pin of interest with reference to the CTR and follows the critical timing path through the circuit in both directions. The CTR contains timing information about almost all pins, nets, and devices of a circuit. It contains the information as to which device is connected to which net and thus, can be used to reconstruct the netlist of the circuit. In that way, starting from a pin of choice, or start pin, and knowing the circuit netlist, the critical timing path can be traced through the circuit from the start pin in both directions, until reaching either: (i) a latch; or (ii) a macro input/output (I/O) pin. The result of aggregating this information is an EPR for the most critical timing path for which the start pin is associated.

A method according to the present disclosure for creating an EPR path for an arbitrary pin may include the step of parsing the CTR and creating an in-memory representation of the CTR containing all the devices (blocks), nets, pins, and their connections of the macro (the CTR is stored as a file in the macro timing abstract and can thus be parsed). Alternatively, the method may include one, or more, of the following steps: (i) extract the name of the macro to load using the upper hierarchy unit end point report cell name; (ii) compute the file pointer to the macro timing report using the name of the macro (the macro timing report is available in the unit timing report as a file link); (iii) parse the comprehensive timing report data into memory; and (iv) link together the devices, nets, and pins where connected.

The resulting in-memory representation from method(s) disclosed herein may include a netlist that already contains pointers from devices over pins to the connected nets and vice versa. In that way, the timing information is associated with the pins. Accordingly, an arbitrary pin of the macro circuit can be selected. Then, by following the critical path through the circuit, an EPR can be created.

A method according to the present disclosure for retrieving the critical end point path for a pin from the macro timing data may include one, or more, of the following steps: (i) rebuild the circuit based on the timing simulation results; (ii) follow all the pin connections in the netlist through the macro circuit with reference to the simulation comprehensive timing report; (iii) tracing the critical timing path forward until a sync latch or output pin is reached; (iv) tracing the critical timing path backwards until the launching latch or an input pin is reached; and/or (v) adding all traversed pins to an aggregate pins list in the right order. In this embodiment, the aggregate pins list is compiled in the chronological order of the pin arrival times.

A method of building the EPR for all found pins according to the present disclosure may include one, or more, of the following steps: (i) gather the timing data from the comprehensive timing report; (ii) compute missing data such as device delays; and (iii) convert the list to an end point report with its usual table format.

FIG. 2 shows a flow chart 300 depicting a first embodiment method for generating an end point report according to an embodiment of the present invention. FIG. 1, as discussed above, shows end point report generator program 150 for performing at least some of the method steps of flow chart 300. This method and associated software will now be discussed, over the course of the following paragraphs, with extensive reference to FIG. 2 (for the method step blocks) and FIG. 1 (for the software blocks).

Processing begins at step S305, where macro timing module 155 receives the CTR corresponding to the IC timing simulation of interest from CTR store 160.

Processing proceeds to step S310, where macro timing module 155 retrieves the macro timing data from the CTR received in step S305.

Processing proceeds to step S315, where start pin module 165 identifies the start pin data within the macro timing data retrieved in step S310. The start pin identification is recorded as the first pin in the aggregate pin list. Pins may be identified with respect to the worst case timing path by one, or more, of the following characteristics: (i) name; (ii) owner; (iii) arrival time; (iv) slack; (v) slew; (vi) capacitive load; (vii) wire delay; and/or (viii) phase.

Processing proceeds to step S320, where forward trace module 170 traces forward the worst timing path from the start pin until it reaches either the output pin or the receiving latch. When each intervening pin on the worst timing path is reached, the pin identification is recorded in the forward-traversed pin list.

Processing proceeds to step S325, where backward trace module 175 traces backward the worst timing path from the start pin until it reaches either the input pin or the launching latch. When each intervening pin on the worst timing path is reached, the pin identification is recorded in the backward-traversed pin list.

Processing ends at step S330, where end point report module 180 produces an EPR for the worst timing path to include the start pin. The EPR is based on the aggregate pin list. The end point report module adds the forward-traversed pin list, the start pin, and the backward-traversed pin list to the aggregate pin list in order to produce the EPR, which includes each pin of the worst-timing path.

FIGS. 3 through 6 are flowcharts depicting a second embodiment process 120 performed by end point report generator system 100 (see FIG. 1) to generate an EPR based on the CTR according to an embodiment of the present invention.

Process 120 begins at step S102, where macro timing data is received into CTR store 160. The CTR contains macro timing data for all macro pins. Macro timing module 155 parses the CTR for the macro timing data. In this step, all pins, devices, and wires are linked to a netlist that is in memory.

Processing proceeds to step S104, where start pin module 165 loads start pin timing data and adds the data to the aggregate pin list. Starting from an arbitrary pin, the start pin, the EPR program proceeds to trace the circuit paths through the netlist, or reconstructed circuit, according to steps S106 and S108, below.

Processing proceeds to step S106, where forward trace module 170 traces the worst timing path forward until the path reaches a macro output pin or a receiving latch.

Figure 4:
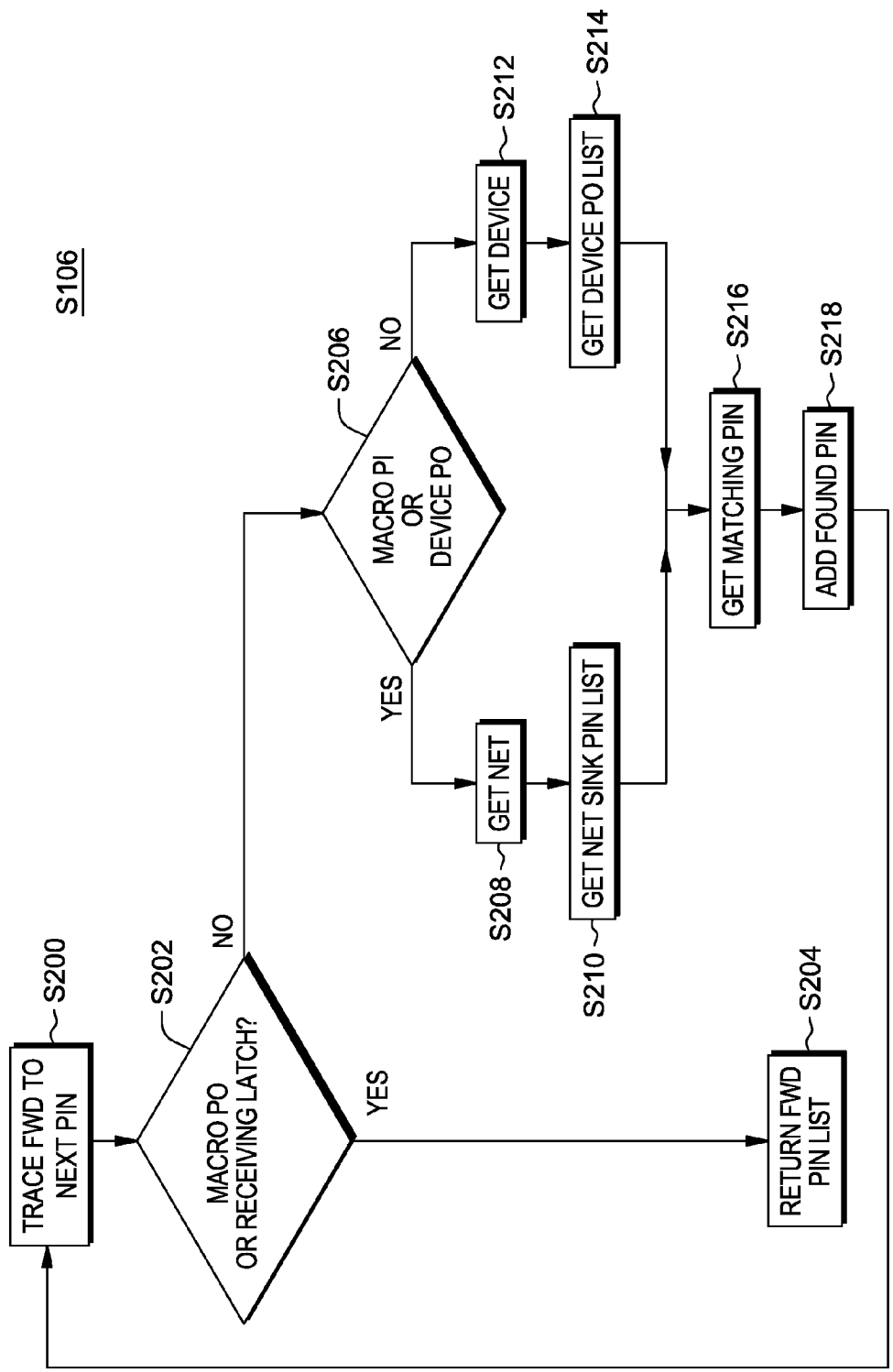
FIG. 4 is a flowchart depicting operational steps of a step within the second embodiment process of FIG. 3, for generating an end point report, in accordance with an embodiment of the present invention.

Referring now to FIG. 4 showing one exemplary process for completing step S106, processing proceeds to step S200, where forward trace module 170 traces the worst timing path forward to a next pin, which becomes a current pin.

Processing proceeds to step S202, where forward trace module 170 determines whether the current pin is: (i) a macro output pin; or (ii) a receiving latch. If the current pin is a macro output pin or a receiving latch, processing proceeds to step S204, where forward trace module 170 returns the forward-traversed pins list (a list of pins and/or test points found while tracing forward) for further processing at step S115, below. If the current pin is not a macro output pin or a receiving latch, processing proceeds to step S206, where the forward trace module determines whether the current pin is: (i) a macro input pin; or (ii) a device output pin.

If the current pin is either a macro input pin or a device output pin, processing proceeds to step S208, where forward trace module 170 retrieves the net connected to the current pin. Processing proceeds to step S210, where the forward trace module retrieves a list of net sink pins. Processing proceeds to step S216, discussed below.

If the current pin is not a macro input pin or a device output pin, then it is a device input pin and processing proceeds to step S212, where forward trace module 170 retrieves the device connected to the current pin according to the netlist. Processing proceeds to step S214, where the forward trace module retrieves the device output pin list from the netlist.

Processing proceeds to step S216, where forward trace module 170 retrieves from the device output pin list or the net sink pin list a matching pin having either: (i) matching slack and phase; or (ii) worst slack and matching phase.

Processing proceeds to step S218, where the forward trace module adds the pin found in step S216 to the tail of the forward-traversed pins list and makes the found pin the current pin. Processing returns to step S200, where the forward trace module traces the worst timing path forward from the current pin to a macro output pin or receiving latch, or next pin. The next pin is then designated as the current pin. Processing continues through steps S202 to S218 until the current pin is a macro output pin or a receiving latch, at which time processing proceeds to step S204, where forward trace module 170 returns the forward-traversed pins list for use in step S115, below.

In an alternative embodiment, step 202 does not stop when reaching the first receiving latch but treats it as a device and continues forward traversal as described above until it reaches the second receiving latch or a macro output pin. Accordingly, the resulting end point report not only includes the critical path of the clock cycle containing the start pin but also the critical path starting from the first receiving latch. In that way, a user can recognize if it would be advantageous to move logic from one clock cycle to another to improve the timing in the more critical cycle.

Processing proceeds to step S108, where backward trace module 175 traces the worst timing path backward until the traced path reaches a macro input pin or a launching latch.

Figure 5:
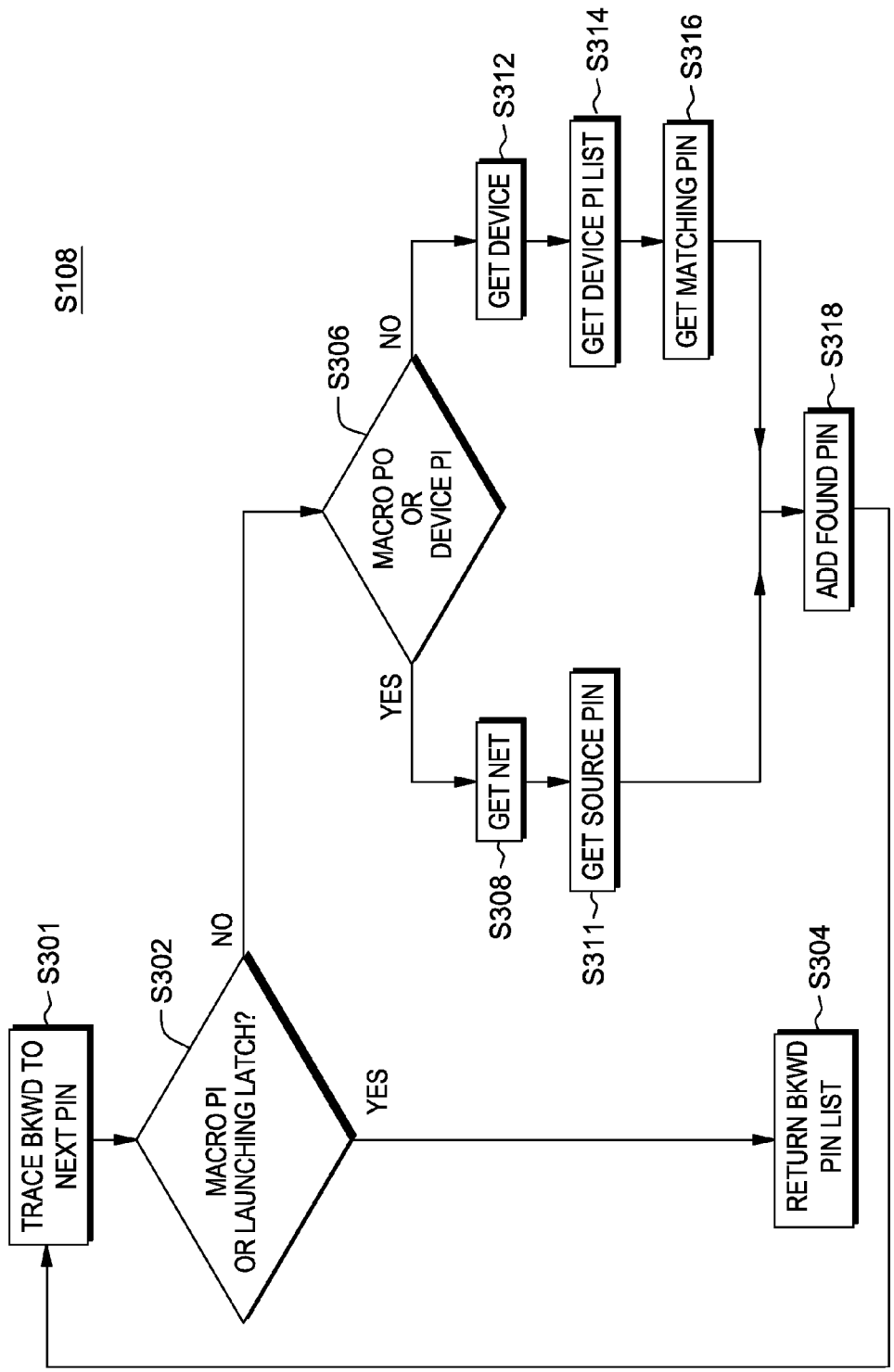
FIG. 5 is a flowchart depicting operational steps of a step within the second embodiment process of FIG. 3, for generating an end point report, in accordance with an embodiment of the present invention.

Referring now to FIG. 5 showing one exemplary process performed by backward trace module 175 for completing step S108, processing proceeds to step S301, where the backward trace module traces the worst timing path backward to a macro input pin or launching latch. It should be noted that this traversal occurs on the circuit reconstruction based on the comprehensive timing report from the timing simulation results.

Processing proceeds to step S302, where backward trace module 175 determines whether the current pin is: (i) a macro input pin; or (ii) a launching latch. If the current pin is a macro input pin or a launching latch, processing proceeds to step S304, where the backward trace module returns backward-traversed pins list (a list of pins and/or test points found while tracing backward) for further processing at step S115, below. If the current pin is not a macro input pin or a launching latch, processing proceeds to step S306, where the backward trace module determines whether the current pin is: (i) a macro output pin; or (ii) a device input pin.

If the current pin is either a macro output pin or a device input pin, processing proceeds to step S308, where the backward trace module retrieves the net connected to the current pin. Processing proceeds to step S311, where the backward trace module retrieves the source pin. Processing then proceeds to step S318, discussed below.

If the current pin is not a macro output pin or a device input pin, it is a device output pin and processing proceeds to step S312, where the backward trace module retrieves the device connected to the current pin according to the netlist. Processing proceeds to step S314, where the backward trace module retrieves the device input pin list from the netlist. Processing proceeds to step S316, where the backward trace module retrieves from the device input pin list a matching pin having either: (i) matching slack and phase; or (ii) worst slack and matching phase.

Processing proceeds to step S318, where backward trace module 175 adds the pin found in step S316 to the head of the backward-traversed pins list and makes the found pin the current pin. Processing returns to step S301, where the backward trace module traces the worst timing path backward from the current pin to a macro input pin or launching latch, or next pin. The next pin is then designated as the current pin. Processing continues through steps S302 to S318 until the next pin is a macro input pin or a launching latch when processing proceeds to step S304, where the backward trace module returns the backward-traversed pins list for use in step S115.

In an alternative embodiment, step 302 does not stop when reaching the first launching latch but treats it as a device and continues backward traversal as described above until it reaches the second launching latch or a macro input pin. Accordingly, the resulting end point report not only includes the critical path of the clock cycle containing the start pin but also the critical path ending in the first launching latch. In that way, a user can recognize if it would be advantageous to move logic from one clock cycle to another to improve the timing in the more critical cycle.

Processing proceeds to step S115 (see FIG. 3), where end point report module 180 generates an EPR from the two lists of traversed pins provided from steps S106 and S108.

Figure 6:
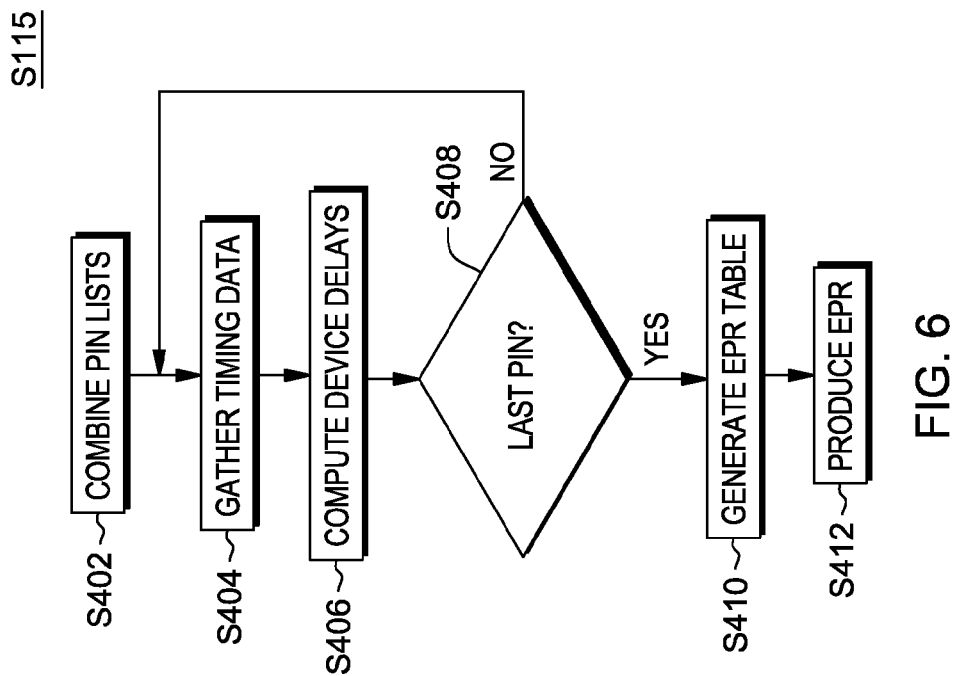
FIG. 6 is a flowchart depicting operational steps of a step within the second embodiment process of FIG. 3, for generating an end point report, in accordance with an embodiment of the present invention.

Referring now to FIG. 6 showing one exemplary process performed by the end point report module for completing step S115. Processing proceeds to step S402, where the EPR module combines the start pin with the pins from both the forward-traversed pin list and the backward-traversed pin list to the aggregate pin list. The EPR module then processes each pin in the aggregate pin list, starting with the first pin of the aggregate pin list (that is, the head of the backward-traversed pin list), according to the following steps S404 and S406. In summary, the following process revises the aggregate pin list with timing data and device delay data and produces an end point report from the revised aggregate pin list.

Processing proceeds to step S404, where the EPR module gathers timing data for a current pin in the aggregate pin list from the CTR.

Processing proceeds to step S406, where the EPR module computes device delays. In this step, any missing data is computed based on the neighboring test points.

Processing proceeds to step S408, where the EPR module determines whether the current pin in the aggregate pin list is the last pin on the list. If the current pin is the last pin on the aggregate pin list, processing proceeds to step S410, discussed below. If the current pin is not the last pin on the aggregate pin list, processing returns to step S404, where the EPR module takes a next pin from the aggregate pin list, and the next pin is designated as the current pin. Processing for the current pin proceeds according to S404 and S406 until the EPR module determines in step S408 that the current pin is the last pin on the aggregate pin list.

When the EPR module determines that the current pin is the last pin on the aggregate pin list, processing proceeds to step S410, where the EPR module generates the EPR "table" from the aggregate pin list.

Processing ends at step S412, where EPR module 180 produces the EPR for display and/or use otherwise by a user.

Figure 7:
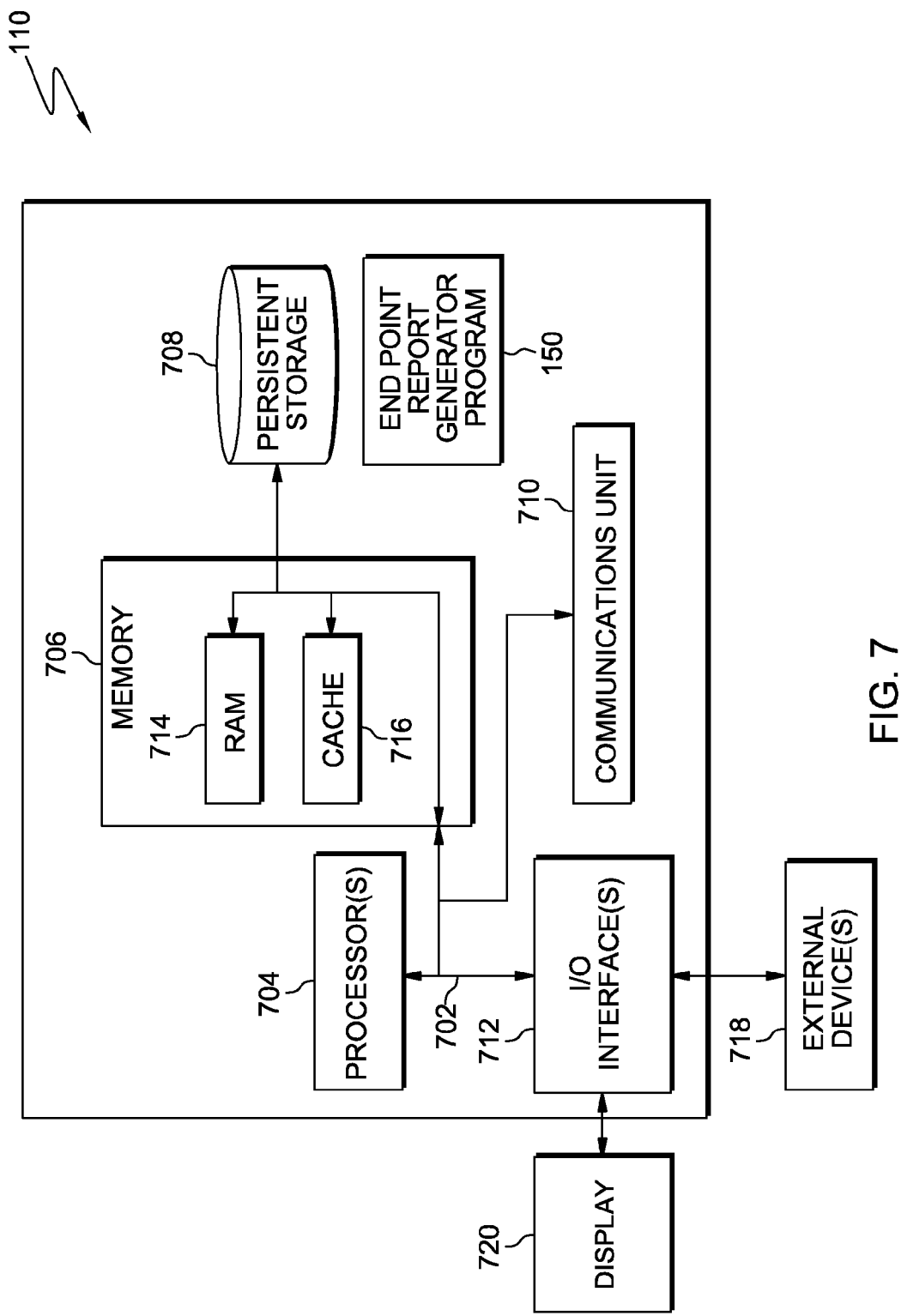
FIG. 7 depicts a block diagram of components of the computing device executing the end point report program, in accordance with an embodiment of the present invention.

FIG. 7 depicts a block diagram of components of computing device 110 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 110 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

End point report generator program 150 is stored in persistent storage 708 for execution by one or more of the respective computer processor(s) 704 via one or more memories of memory 706. In this embodiment, persistent storage 708 includes a magnetic hard disk drive. Alternatively, or in addition to a magnetic hard disk drive, persistent storage 708 can include a solid-state hard drive, a semiconductor storage device, a read-only memory (ROM), an erasable programmable read-only memory (EPROM), a flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources such as an enterprise grid and/or client devices. In these examples, communications unit 710 includes one or more network interface cards. Communications unit 710 may provide communications through the use of either or both physical and wireless communications links. End point report generator program 150 may be downloaded to persistent storage 708 through communications unit 710.

I/O interface(s) 712 allows for input and output of data with other devices that may be connected to computing device 110. For example, I/O interface(s) 712 may provide a connection to external device(s) 718 such as a keyboard, a keypad, a touch screen, and/or some other suitable input device. External device(s) 718 can also include portable computer-readable storage media such as, for example, thumb drives, portable optical or magnetic disks, and memory cards. Software and data used to practice embodiments of the present invention, such as program 150, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating a worst timing path for an arbitrary pin within an electronic circuit, the method comprising:
    receiving a comprehensive timing report for the electronic circuit;
    determining a timing data set for the arbitrary pin based, at least in part, upon the comprehensive timing report;
    determining a worst timing path that includes the arbitrary pin based, at least in part, upon the timing data set; and
    generating an end point report entry for the worst timing path that includes the arbitrary pin;
    wherein:
    the worst timing path for the arbitrary pin is not included in an existing end point report; and
    at least the determining a timing data set, determining a worst timing path, and generating an end point report are performed by computer software running on computer hardware.

2. The method of claim 1 wherein the determining a worst timing path step comprises:
    deriving an interconnection structure of the electronic circuit from the comprehensive timing report; and
    determining the worst timing path that includes the arbitrary pin is further based, at least in part, upon the derived interconnection structure.

3. The method of claim 2 wherein determining the worst timing path is further based, at least in part, upon a complete netlist for the electronic circuit.

4. The method of claim 1 wherein the determining a worst timing path step comprises:
    tracing the worst timing path forward from the arbitrary pin until one of a macro output pin or a first receiving latch pin is reached; and
    tracing the worst timing path backward from the arbitrary pin until one of a macro input pin or a first launching latch pin is reached.

5. The method of claim 4 further comprising:
    responsive to reaching the first receiving latch pin, tracing the worst timing path forward from the arbitrary pin until one of a macro output pin or a second receiving latch pin is reached.

6. The method of claim 4 further comprising:
    responsive to reaching the first launching latch pin, tracing the worst timing path backward from the arbitrary pin until one of a macro input pin or a second launching latch pin is reached.

7. The method of claim 4 further comprising:
    storing a pin data set including:
        an identity of each pin traversed while tracing the worst timing path; and
        an arrival time of each pin traversed while tracing the worst timing path.

8. The method of claim 7 further comprising:
    compiling the pin data set in chronological order based on the arrival time of each pin.

9. A computer program product for generating a worst timing path for an arbitrary pin within an electronic circuit, the computer program product comprising:
    one or more non-transitory computer-readable storage media and program instructions stored on the one or more non-transitory computer-readable storage media, the program instructions comprising:
    program instructions to:
    receive a comprehensive timing report for the electronic circuit;
    determine a timing data set for the arbitrary pin based, at least in part, upon the comprehensive timing report;
    determine the worst timing path that includes the arbitrary pin based, at least in part, upon the timing data set; and
    generate an end point report for the worst timing path;
    wherein:
    the worst timing path for the arbitrary pin is not included in an existing end point report.

10. The computer program product of claim 9 wherein the program instructions to determine the worst timing path comprise program instructions to:
    derive an interconnection structure of the electronic circuit from the comprehensive timing report; and
    determine the worst timing path that includes the arbitrary pin is further based, at least in part, upon the derived interconnection structure.

11. The computer program product of claim 10 wherein determining the worst timing path is further based, at least in part, upon a complete netlist for the electronic circuit.

12. The computer program product of claim 9 wherein the program instructions to determine the worst timing path comprise program instructions to:
    trace the worst timing path forward from the arbitrary pin until one of a macro output pin or a first receiving latch pin is reached; and
    trace the worst timing path backward from the arbitrary pin until one of a macro input pin or a first launching latch pin is reached.

13. The computer program product of claim 12 wherein the program instructions to determine the worst timing path comprise program instructions to:
    responsive to reaching the first receiving latch pin, trace the worst timing path forward from the arbitrary pin until one of a macro output pin or a second receiving latch pin is reached.

14. The computer program product of claim 12 wherein the program instructions to determine the worst timing path comprise program instructions to:
    responsive to reaching the first launching latch pin, trace the worst timing path backward from the arbitrary pin until one of a macro input pin or a second launching latch pin is reached.

15. The computer program product of claim 12 wherein the program instructions further comprise program instructions to:

store a pin data set including:
- an identity of each pin traversed while tracing the worst timing path; and
- an arrival time of each pin traversed while tracing the worst timing path.

16. The computer program product of claim 15 wherein the program instructions further comprise program instructions to:
- compile the pin data set in chronological order based on the arrival time of each pin.

17. A computer system for generating a worst timing path for an arbitrary pin within an electronic circuit, the computer system comprising:
- one or more computer processors;
- one or more computer-readable storage media;
- program instructions stored on the computer-readable storage media for execution by at least one of the one or more processors, the program instructions comprising: program instructions to:
  - receive a comprehensive timing report for the electronic circuit;
  - determine a timing data set for the arbitrary pin based, at least in part, upon the comprehensive timing report;
  - determine the worst timing path that includes the arbitrary pin based, at least in part, upon the timing data set; and
  - generate an end point report for the worst timing path;

wherein:
- the worst timing path for the arbitrary pin is not included in an existing end point report.

18. The computer system of claim 17 wherein the program instructions to determine the worst timing path comprise program instructions to:
- derive an interconnection structure of the electronic circuit from the comprehensive timing report; and
- determine the worst timing path that includes the arbitrary pin is further based, at least in part, upon the derived interconnection structure.

19. The computer system of claim 17 wherein the program instructions to determine the worst timing path comprise program instructions to:
- trace the worst timing path forward from the arbitrary pin until one of a macro output pin or a first receiving latch pin is reached; and
- trace the worst timing path backward from the arbitrary pin until one of a macro input pin or a first launching latch pin is reached.

20. The computer system of claim 19 wherein the program instructions further comprise program instructions to:
- store a pin data set including:
  - an identity of each pin traversed while tracing the worst timing path; and
  - an arrival time of each pin traversed while tracing the worst timing path.

\* \* \* \* \*